(12) United States Patent
Qian et al.

(10) Patent No.: US 8,089,897 B2
(45) Date of Patent: Jan. 3, 2012

(54) VPN INTELLIGENT ROUTE SERVICE CONTROL POINT TROUBLE DIAGNOSTICS

(75) Inventors: Zhiqiang Qian, Holmdel, NJ (US); Paritosh Bajpay, Edison, NJ (US); Jackson Liu, Middletown, NJ (US); Michael Zinnikas, North Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 255 days.

(21) Appl. No.: 12/380,238

(22) Filed: Feb. 25, 2009

(65) Prior Publication Data
US 2010/0214932 A1 Aug. 26, 2010

(51) Int. Cl.
*H04L 12/26* (2006.01)

(52) U.S. Cl. ......................................... 370/252; 709/224
(58) Field of Classification Search .......... 370/216–228, 370/241–253; 709/220–226; 714/1–4, 25, 714/48
See application file for complete search history.

(56) References Cited

U.S. PATENT DOCUMENTS
7,680,923 B1 * 3/2010 Allan ............................. 709/224
* cited by examiner

*Primary Examiner* — Pao Sinkantarakorn
(74) *Attorney, Agent, or Firm* — Hanley, Flight, & Zimmerman, LLC

(57) ABSTRACT

Systems and methods are described that analyze Layer 3 network performance between a network and its Intelligent Route Service Control Point (IRSCP) architecture to identify problems without having to disrupt customer service.

18 Claims, 9 Drawing Sheets

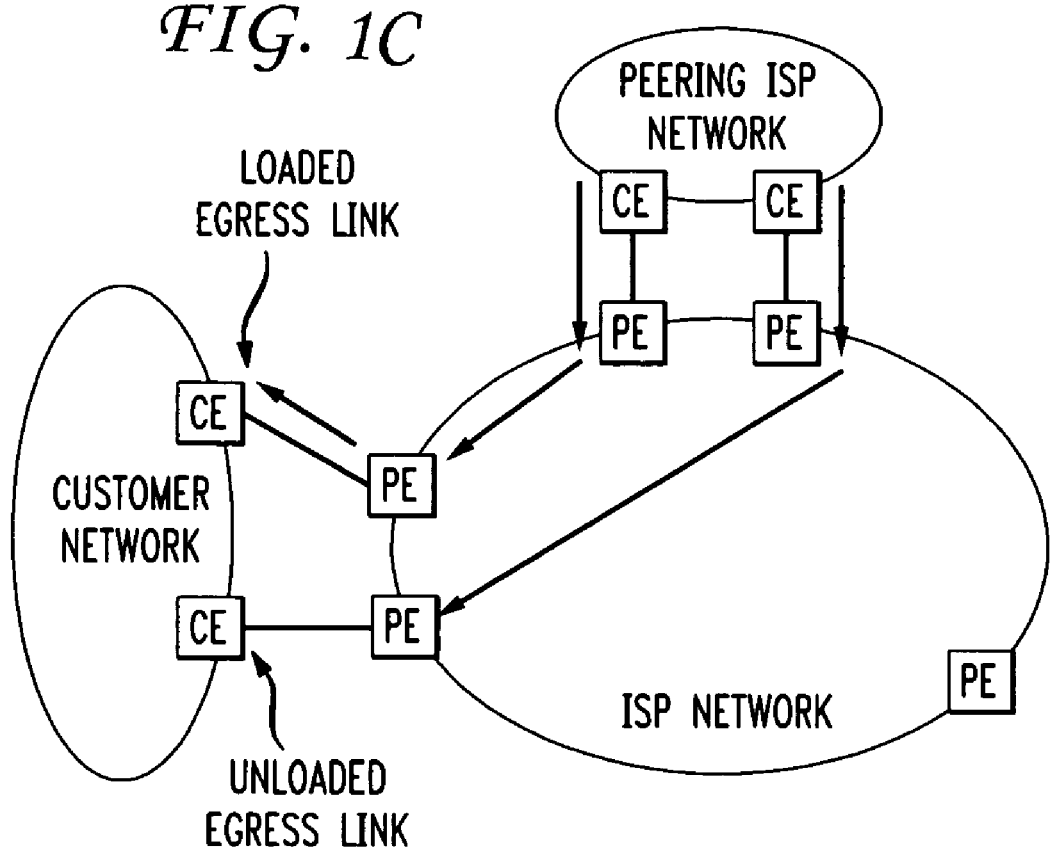

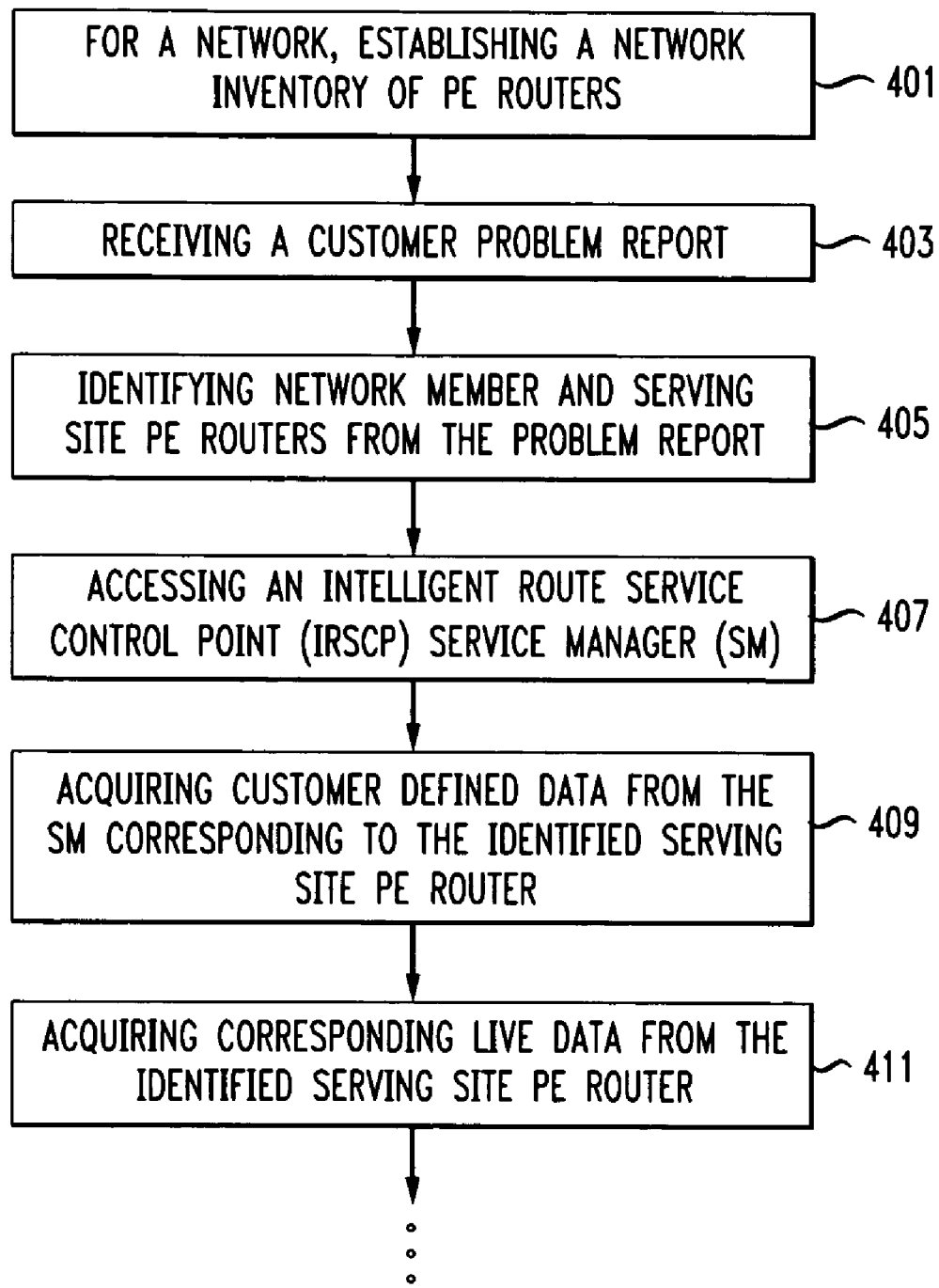

VPN INTELLIGENT ROUTE SERVICE CONTROL POINT TROUBLE DIAGNOSTICS

FIELD OF THE INVENTION

The invention relates generally to Layer 3 network performance monitoring. More specifically, the invention relates to systems and methods that analyze Layer 3 network performance between a network and its Intelligent Route Service Control Point (IRSCP) to identify problems without having to disrupt customer service.

BACKGROUND OF THE INVENTION

To improve the reliability of Internet access, customers and data centers often connect to an Internet Service Provider (ISP) using multiple access links. However, customers find that inbound traffic usage of their access links is heavily unbalanced and underutilizes the available access link capacity.

To aid customers in addressing this problem, a solution that allows an ISP to flexibly engineer interdomain routing on a per-customer, per-router basis, taking input from both network-wide and customer-specific policies was created as the Intelligent Route Service Control Point (IRSCP) architecture. The IRSCP implements precise and manageable control of interdomain routing, presenting an interface that enables a large range of Traffic Engineering (TE) applications of which customer traffic load balancing is only one example. IRSCP is a centralized network control device that interacts with Provider Edge (PE) routers to conduct route selection, gateway selection, load balance, schedule maintenance and policy modification.

The IRSCP architecture allows a network operator to flexibly control routing between the traffic ingresses and egresses within an ISP's network without modifying the ISP's existing routers. The IRSCP subsumes the control plane of an ISP's network by replacing the distributed Border Gateway Protocol (BGP) decision process of each router in the network with a flexible, logically centralized application controlled route computation. The IRSCP supplements the traditional BGP decision process with an explicitly ranked decision process that allows route control applications to provide a per-destination, per-router explicit ranking of traffic egresses.

BGP is the core routing protocol of the Internet. It maintains a table of IP networks or prefixes which designate network reachability among Autonomous Systems (ASs) and is a path vector protocol. BGP does not use traditional Interior Gateway Protocol (IGP) metrics, but makes routing decisions based on path, network policies and/or rule sets.

Internet routing deals with finding a loop free path between source and destination endpoints. Within a particular network or AS, routing is realized by a fixed, simple BGP decision process that ensures consistent decision making between the routers in the network while respecting the network operator's policies.

The IRSCP subsumes the routing decision process in a system framework separate from the routers in a network towards a new routing infrastructure. IRSCP eases the realization of applications that dynamically manage connectivity. Specifically, an ISP's route control application is allowed to control route selection through an independent interface. The interface is based on the abstraction of a ranking of egress routes for each router and destination. Application means network control and management functions that a service provider would employ to provide services.

The IRSCP maintains complete control of the route selection function for all routers in the network. This is achieved by having the IRSCP communicate directly with routers in neighboring networks via exterior BGP (eBGP), in addition to communicating interior BGP (iBGP) with the routers in the IRSCP enabled network. This gives IRSCP full visibility of all routes available in the network. The IRSCP is the sole controller of BGP route selection, meaning that all of the network's routing policy can be handled by the route control application through the IRSCP, as opposed to placing policy configuration on the routers themselves.

Realizing an IRSCP that has complete control of route selection faces two important challenges. First, because routers in the IRSCP-enabled network completely rely on the IRSCP for routing decisions, the IRSCP infrastructure must be substantially more robust than an iBGP IRSCP. A complete failure of an eBGP IRSCP would cause all routes in the network to be withdrawn incapacitating the underlying network.

Second, the need for complete route control and full visibility poses significant scalability challenges. To address these concerns, the IRSCP functionality is partitioned and distributed across a number of servers to ensure consistent decision making as a whole. Although the IRSCP is physically distributed, it presents a logically centralized abstraction from the point of view of a route control application. While the route control application has to interact with all IRSCP servers, it can remain agnostic to where these servers reside in the network and what set of routers each server controls.

The IRSCP employs a modified BGP decision process, an explicitly ranked decision process, in conjunction with a route control interface that enables route control applications to directly guide the route selection process.

FIG. 1A shows a simplified view of the physical infrastructure of a Multiprotocol Label Switching (MPLS) enabled ISP network with solid lines representing physical links. Routers at the periphery of the ISP network couple to other ISPs (peers) and to customers. These routers are Provider Edge (PE) routers. Routers that interconnect the PE routers are Provider (P) routers. Routers that couple to the PE routers are Customer Edge (CE) routers. A CE router is also used to represent peer routers that connect to the ISP. BGP allows an ISP to learn about destinations reachable through its customers and peers. Typically every PE router maintains BGP sessions with its attached CE routers and also with other PE routers in the ISP network. The CE router sessions are eBGP sessions and the PE router sessions are iBGP sessions.

FIG. 1B shows representative communications with MPLS tunnels and iBGP represented by bold broken lines and eBGP represented by broken lines. When a PE router receives a route through its eBGP session, it propagates the route to other PE routers through iBGP sessions, allowing every PE router to learn how to reach every peer or customer network. The path traffic follows between ingress and egress routers is determined by Interior Gateway Protocol (IGP), such as Open Shortest Path First (OSPF). In an MPLS network, label switched paths are established between all PE routers obviating the need to run BGP on P routers. While MPLS is used for setting up and managing tunnels, the actual tunnel path over which a tunnel is set up is determined by the IGP.

A PE router usually receives more than one egress route for a given destination and must run a route selection algorithm called the BGP decision process to select the best route to use for data forwarding.

FIG. 1C shows a specific problem introduced by BGP's hot-potato routing, motivating the need to enhance route selection with an IRSCP. The customer in FIG. 1C has multi-homed to the provider network for the purpose of redundancy and the same destinations are reachable via both links shown by solid arrows. All PE routers in the provider network have two possible routes to reach the customer network. Most of the traffic destined to the customer network enters the provider network from the peering ISP network. Assuming unit TOP costs for each internal provider link in FIG. 1A, the two ingress PE routers prefer the route via the top egress PE router coupled to the customer network (FIG. 1C). This leads to a load imbalance on the two egress links, with the top egress link carrying all or most of the traffic, which in turn may result in congestion.

In practice the customer or ISP may prefer the ISP to load balance traffic on the two egress links while still considering the path cost between ingress and egress. In the IRSCP this is achieved by basing the decision process on the input from a load balancing route control application run by the ISP, which takes into account IGP path cost, as well as "offered" ingress load and capacity of egress links. The route control application directly controls route selection for each PE router and, in this example, directs the two ingress PE routers to each send traffic to a different egress PE router. This routing solution cannot be achieved in BGP without manipulating BGP attributes on multiple PE routers through vendor specific configuration languages.

Since customers can manipulate the live routing process in VPN networks via an IRSCP Service Manager (SM), it would make IP network troubleshooting more time consuming and labor intensive. Technicians would not only need to analyze route group settings, but would also need to examine IRSCP configurations.

When an IRSCP outage occurs, technicians have to locate the problem from serving site PE routers to member site PE routers by manually querying various inventory systems. Serving site PE routers are predefined according to a hub-spoke implementation. A hub or a serving site PE router can communicate to any PE routers in a network while a spoke or a member site PE router can not communicate to another member site PE router directly. A member site PE router must communicate with a designated serving site PE router first. Since a serving site PE router is the destination of a member site PE router, troubleshooting has to start from a serving site PE router and then to its member site PE routers.

Most telecommunications companies rely on technicians or semi-automated troubleshooting tools to identify and locate network problems including IRSCP. What is desired are systems and methods that perform automated non-intrusive testing to locate IRSCP problems without disrupting customer service.

SUMMARY OF THE INVENTION

The inventors have discovered that it would be desirable to have systems and methods that analyze Layer 3 network performance between a network and its Intelligent Route Service Control Point (IRSCP) architecture to identify problems without having to disrupt customer service. Embodiments provide a trouble diagnostic tool to troubleshoot IRSCP problems and reduce Mean Time To Repair (MTTR) from hours to minutes.

One aspect of the invention provides a method for analyzing Intelligent Route Service Control Point (IRSCP) Layer 3 network performance. Methods according to this aspect of the invention include for a network, establishing a network inventory of Provider Edge (PE) routers, receiving a problem report identifying a serving site PE router, accessing an IRSCP Service Manager (SM) and retrieving customer defined routing data for the identified serving site PE router, acquiring live routing data from the identified serving site PE router, and comparing the acquired live routing data from the serving site PE router with the corresponding routing data from the IRSCP SM to identify disparities.

Another aspect of the invention provides if disparities are found, identifying a configuration problem between the IRSCP SM and the identified serving site PE router, and if no disparities are found, examining the IRSCP routes in the identified serving site PE router routing table to locate a source PE router route.

Another aspect of the invention provides if a Virtual Private Network (VPN) IP address of the source PE router is not found in the identified serving site PE router routing table, identifying a routing table problem, and if the VPN IP address of the source PE router is found in the identified serving site PE router routing table, analyzing each Community Value (CV) associated with the routes in the identified serving site PE router routing table to verify IRSCP route settings.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1B shows exemplary BGP and MPLS tunnels and FIG. 1C shows exemplary traffic ingresses and egresses.

DETAILED DESCRIPTION OF THE PREFERRED EMBODIMENTS

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, systems, and a computer-usable medium storing computer-readable instructions configured to analyze Layer 3 network performance between a network and its Intelligent Route Service Control Point (IRSCP) architecture to identify problems without having to disrupt customer service. Currently, technicians have to manually troubleshoot Layer 3 network problems. Components of the invention may be enabled as a modular framework and/or deployed as software as an application program tangibly embodied on a program storage device. The application code for execution can reside on a plurality of different types of computer readable media known to those skilled in the art.

Embodiments troubleshoot IRSCP problems such as IRSCP configuration problems, IRSCP routes missing in routing tables, mismatches between customer-entered IRSCP data and provisioned data in a live router, incorrect IRSCP settings for local preferences, weights, Community Values (CVs), and the like, using expert rules. Embodiments isolate the problem and issue a trouble report to a network work center for resolution.

Figure 1A:
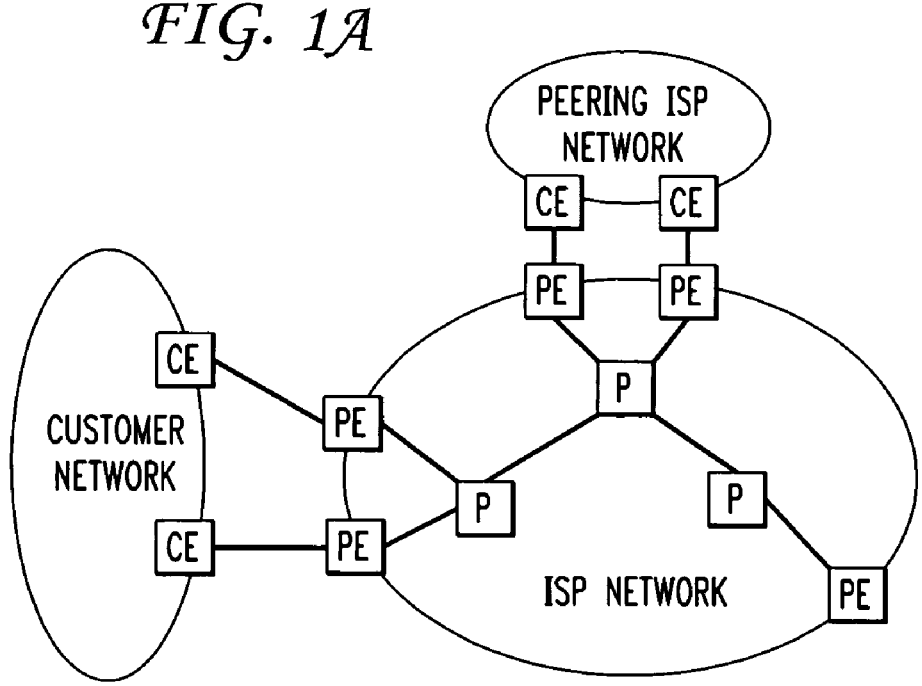
FIG. 1A is an exemplary ISP routing infrastructure physical connectivity.
Figure 1B:
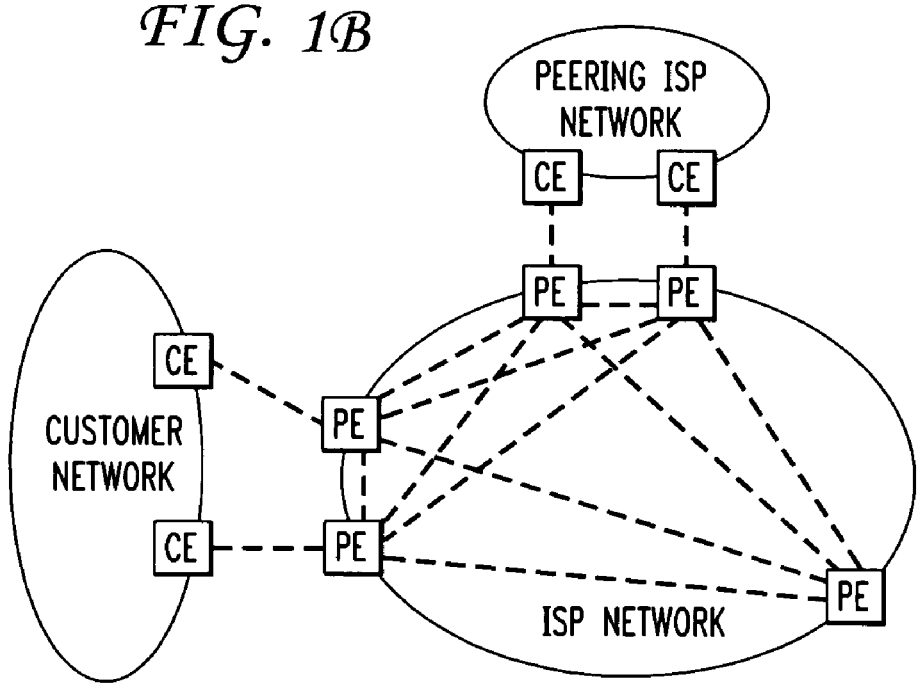
Figure 2:
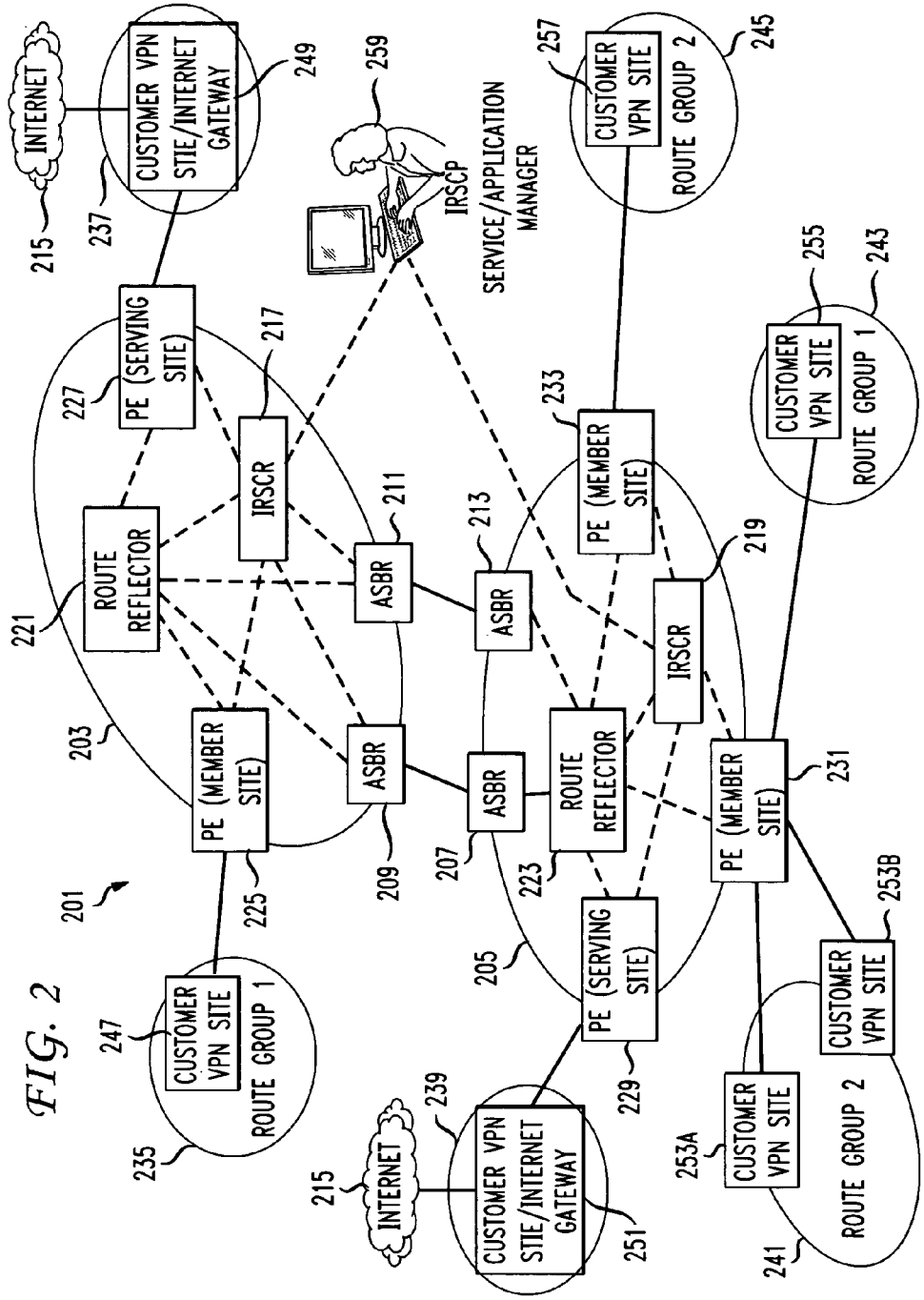
FIG. 2 is an exemplary IRSCP network.

FIG. 2 shows a communication network 201 according to one embodiment. The network 201 includes two VPN AS networks 203, 205 communicating with one another over Asynchronous System Boundary Routers (ASBRs) 207, 209, 211, 213. Both VPNs 203, 205 are MPLS networks providing services to numerous customer networks.

Each VPN 203, 205 include Provider Edge (PE) routers that provide communications to client devices and networks and provide connections to services and additional networks such as the Internet 215. Each VPN 203, 205 employs an IRSCP 217, 219 that provides an iBGP speaking entity that allows for connectivity management in parallel with Route-Reflectors (RRs) 221, 223. More than one RR may be employed in each VPN 203, 205.

To provide connectivity to various customer networks and devices, the VPNs 203, 205 employ a plurality of PE routers 225, 227, 229, 231, 233. The PE routers are further distinguished by their purpose. PE routers serving customer VPNs are member site PE routers 225, 231, 233 serving customer VPN site 235 through its Customer Edge (CE) router 247, VPN site 241 through its CE router 253A and CE router 253B, VPN site 243 through its CE router 255 and VPN site 245 through its CE router 257. PE routers serving customer VPNs/Internet gateways are serving site PE routers 227, 229 serving VPN site 237 through its CE router 249 and VPN site 239 through its CE router 251. Usually, a serving site PE router is the gateway to the Internet. In hub-spoke arrangements, companies only allow serving site PE routers to communicate with entities outside their company. Member site PE routers must communicate through serving site PE routers in order to access the Internet. Therefore, companies control Internet access and filter non-business-related access to the Internet.

A communication directed from one VPN site to another is directed from that site's CE router to the PE router serving the VPN site, where it is passed to the appropriate PE router within the network 201 and passed to the destination VPN site.

As the various routers operate, the number of bytes and packets processed by each router is suitably collected, indexed by source and destination IP address. The IRSCP servers 217, 219 provide connectivity management to be adjusted by external network control such as by an IRSCP Service (application) Manager (SM) 259 for their respective networks.

One activity is the management of traffic statistics. Traffic statistics provide insight into the level of service being received by each customer and proper analysis of traffic statistics provides insight into the presence and sources of failures. Statistics for transit traffic outbound from a router are managed in databases dedicated to managing IP accounting for a network 201. The network 201 hosts accounting databases in each router. The databases typically include an active database and a checkpoint database.

As traffic passes through each network, router databases are updated to reflect the cumulative traffic passing through the various routers for which they maintain statistics. To manage trouble reports, the network 201 includes a fault management console which may be colocated with the IRSCP SM 259. The console collects and manages automated and manually initiated reports relating to failures or deficiencies affecting customer service, and directs and tracks responses to the reports.

Figure 3:
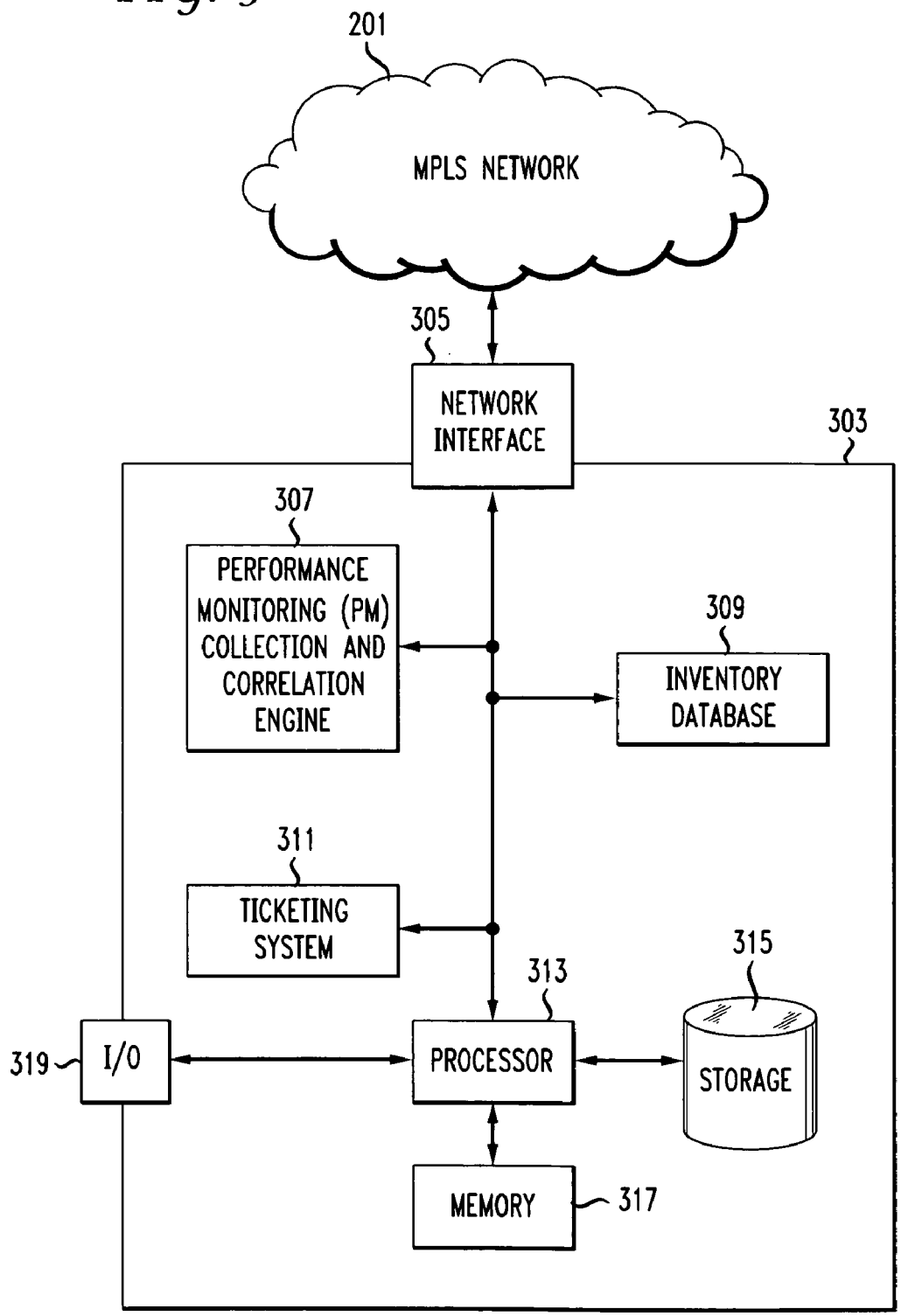
FIG. 3 is an exemplary system architecture.
Figure 4:
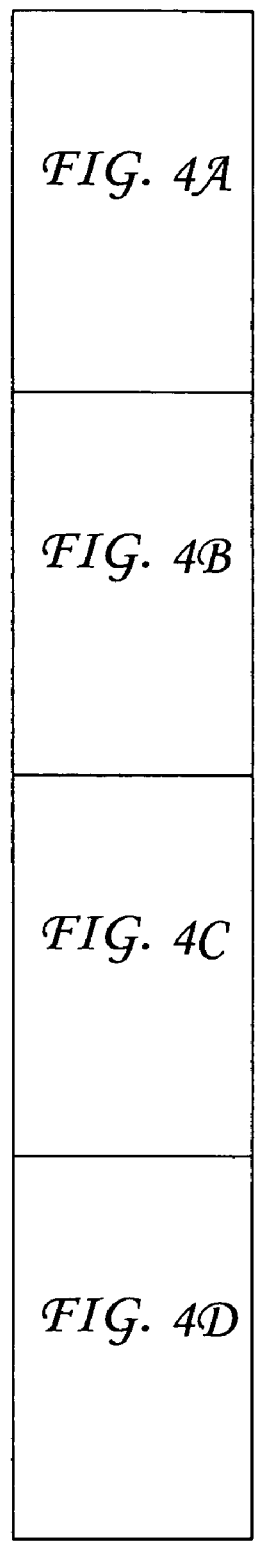
FIG. 4 is an exemplary method.
Figure 4B:
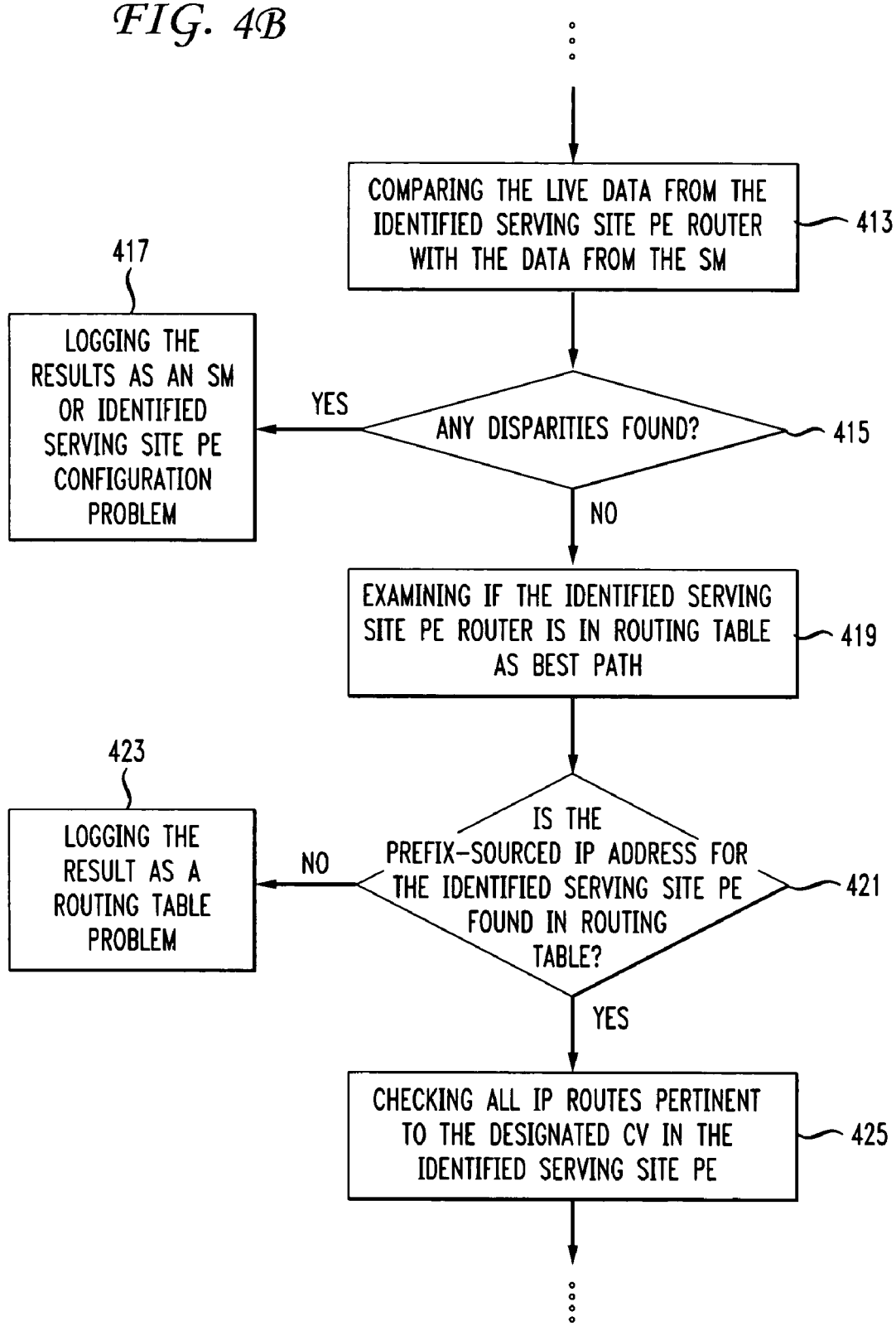
Figure 4C:
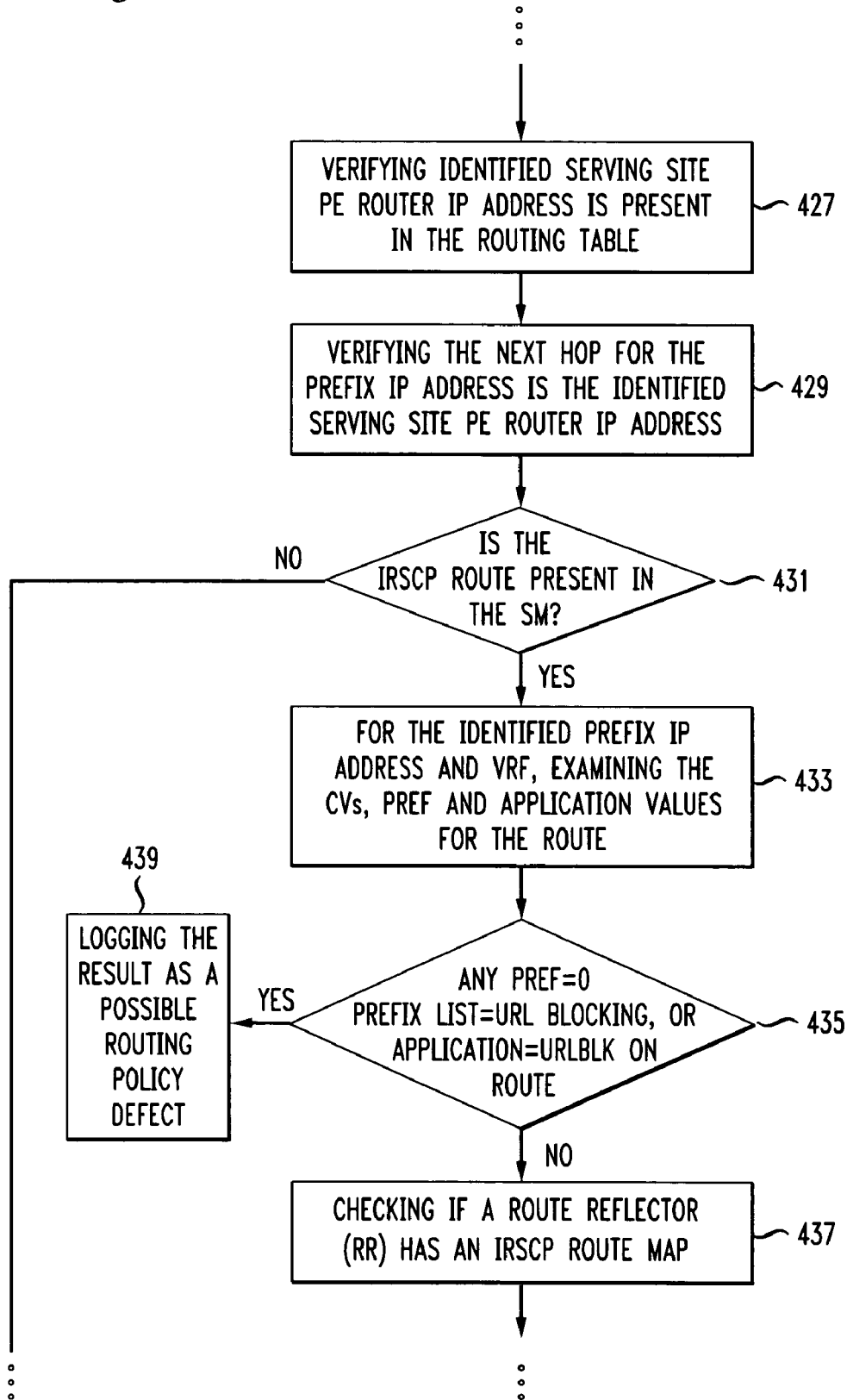
Figure 4D:
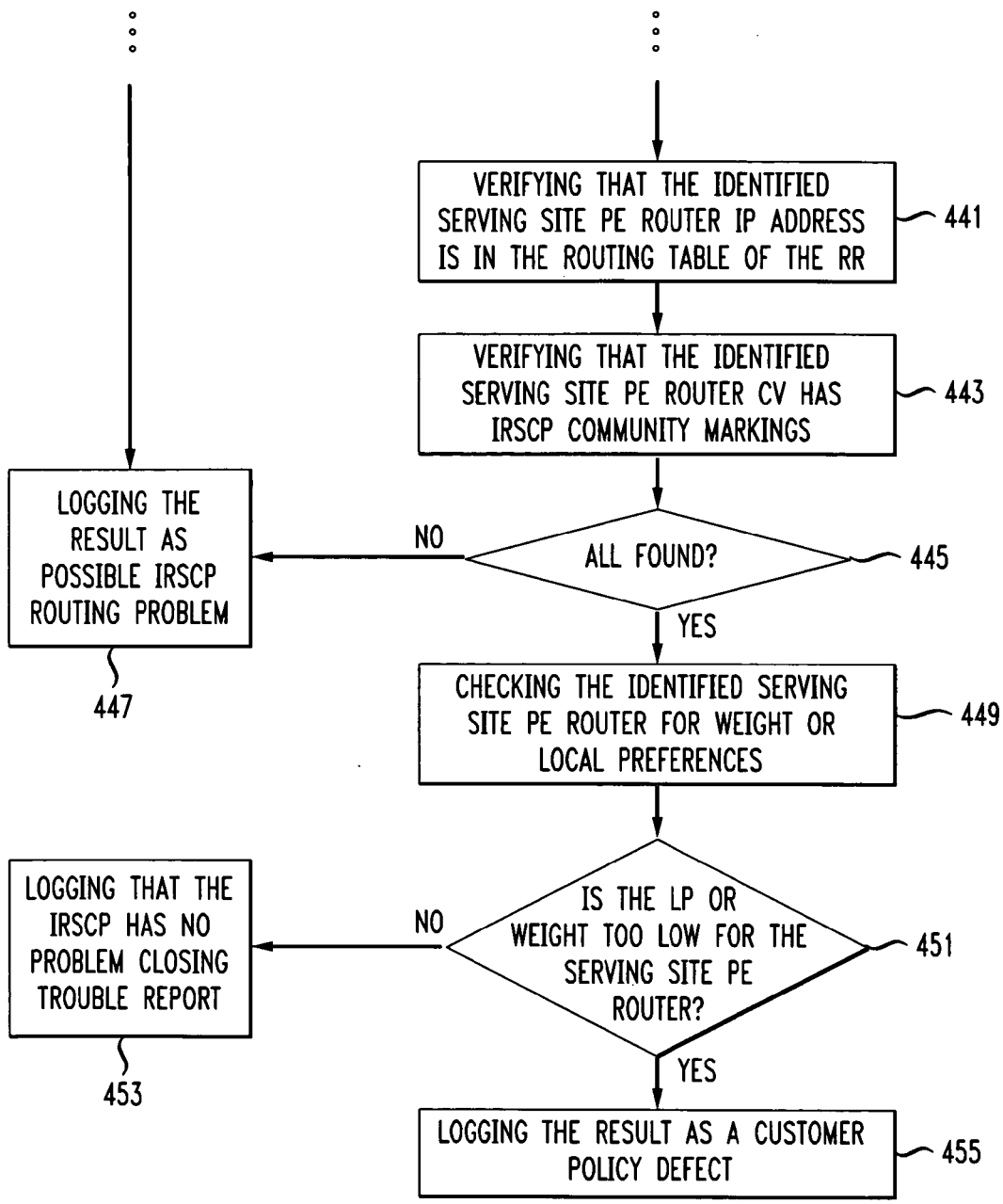

FIG. 3 shows an embodiment of a system 301 framework 303. FIG. 4 shows the fault identification and location method according to one embodiment addressing problems in a network 201 using the system framework 303.

The framework 303 which may be part of a network management server includes a network interface 305 coupled to a network 201 and configured to acquire network topology information, network reachability information, as well as network status information to perform network management services. The network interface 305 is coupled to a Performance Monitoring (PM) collection and correlation engine 307, a network manager/inventory database 309, a ticketing system 311 and a processor 313. The processor 313 is coupled to storage 315, memory 317 and I/O 319.

The framework 303 stores acquired network data into a data store 315. The framework 303 may be implemented as a computer including a processor 313, memory 317, storage devices 315, software and other components. The processor 313 is coupled to the network interface 305, I/O 319, storage 315 and memory 317 and controls the overall operation of the computer by executing instructions defining the configuration. The instructions may be stored in the storage device 315, for example, a magnetic disk, and loaded into the memory 317 when executing the configuration. The invention may be implemented as an application defined by the computer program instructions stored in the memory 317 and/or storage 315 and controlled by the processor 313 executing the computer program instructions. The computer also includes at least one network interface 305 coupled to and communicating with a network 201 to interrogate and receive network configuration or alarm data. The I/O 319 allows for user interaction with the computer via peripheral devices such as a display, a keyboard, a pointing device, and others.

For a defined network 201, a network inventory of PE routers is performed (step 401). The network 201 may be deployed in production prior to implementing embodiments. The PE router (member site and serving site) inventory data may be stored in the database 315. A network 201 may have hundreds of PE routers.

A problem report is received at the IRSCP SM 259 indicating that a customer VPN location (VPN site) is experiencing poor connectivity. The problem report information is used to identify the location. Identification includes examining stored data correlating customer locations and devices with data received from those locations and devices, such as address information (step 403).

A trouble ticket is created that includes location information, the nature of the problem, the affected customer location, and additional information provided by the customer or obtained by querying the customer location. Additional information is examined, such as stored information relating to customer connections and services and elements providing services to particular customers, in order to obtain further information relating to the problem, such as the provider elements serving the customer location.

A PE router directs traffic to a CE router at a customer site, and the CE router then directs traffic received from the provider to appropriate devices within the customer site. The CE router receives traffic from devices within the customer site and directs traffic to the PE router providing service to the customer site. The status of the PE router may be examined to provide insight into the problem (step 405).

A traffic analysis is performed on traffic passing through an identified serving site PE router to determine the Layer 3 port status of the router.

Two statistic samples are taken for the status of the router, separated by a predefined time interval such as 30 seconds. The two samples show cumulative traffic experienced at the router, so that if traffic does not increase, the presence of a routing fault may be experienced. These statistics are generic and not specific to IRSCP routing.

Traffic statistic samples are collected by submitting commands to copy the current status from the active database to the checkpoint database. A sample may be taken of one or more, or all, of the routers in the network, and examined to provide status information for selected routers, or for the network as a whole. The statistical information provided by the samples is examined to determine link and protocol status for the element or elements under consideration. If subsequent samples of the checkpoint database do not show a traffic increase for the router, the router is not passing traffic properly and the port status of the router needs to be investigated.

The IRSCP SM 259 is accessed to retrieve customer defined routing data such as ingress PE router identity, egress PE router identity, prefix (IP address), Route Target (RT), PREF (0-5), Community Value (CV) (such as 13979:3301), and application (step 407). The ingress PE router identity refers to the side of the PE router that faces a customer CE router. The egress PE router is the side that couples to a core network. PREF is associated with a Route Group and CV. PREF 0 is equal to DENY and PREF 1-5 is equal to PERMIT. If a route has PREF 0, that route is denied. The IRSCP SM 259 may be a computer.

Each BGP Layer 3 VPN route propagation is tagged with an RT extended CV when it is advertised (exported) by an egress PE router. The egress side of a PE router connects to a core network. An RR or RT is part of the core network. Any other potential ingress PE router in the network matches that route target with its local VPN Routing and Forwarding (VRF) import policies. If there is a match, the route is imported into that particular VRF or VRFs. In the simplest configuration, a single route target identifies a VPN. It is appended on VRF export by the egress PE router, when the route is advertised to other systems in the provider network, and is used to import routes into that particular VRF. In BGP Layer 3 VPNs, RTs control VPN route propagation between PE routers (step 409).

The live routing data from the identified serving site PE router is retrieved by executing the "router # show IP BGP VPNv4" command with VRF and Prefix (step 411). VRF is the value that directs the route and PREFIX is the source IP or lowest IP of a certain network or subnetwork. The acquired live data from the serving site PE router is compared with corresponding data from the IRSCP SM to identify disparities (step 413).

If disparities are found (step 415), a configuration problem is identified between the IRSCP SM and the identified serving site PE router (step 417).

If no disparities are found, the IRSCP routes in the routing table of the identified serving site PE router are examined to locate the source PE router route by executing the "show IP route VRF" command with VRF and Prefix to display the IP routing table associated with a VRF instance, in user EXEC or privileged EXEC mode (step 419).

If the VPN PREFIX IP address of the identified serving site PE is not found in the identified live serving site PE router routing table (step 421), a routing problem is identified (step 423).

If the VPN IP address is found in the identified serving site PE router routing table, each CV is analyzed to verify IRSCP route settings by executing the command "show IP BGP VPNv4" command with CV as input. The Preference Value, Prefix list and application are examined to detect customer's faulty data input (step 425).

A community is a group of prefixes that share some common property and can be configured with the BGP community attributes (CV). The BGP community attribute is an optional transitive attribute that consists of a set of four octet values that specify a community. The community attribute values are encoded with an AS number in the first two octets, with the remaining two octets defined by the AS, for example, 13979:3301. 13979 is the AS number for the USA.

A prefix can have more than one community attribute. A BGP speaker that sees multiple community attributes in a prefix can act based on one, some, or all the attributes. A router has the option to add or modify a community attribute before the router passes the attribute on to other peers. The Local Preference (LP) attribute is an indication to the AS which path is preferred in order to reach a certain network. When there are multiple paths to the same destination, the path with the higher preference is preferred (the default value of the LP attribute is 100).

Communities may be used as flags in order to mark a set of routes. Upstream service provider routers may use the flags to apply specific routing polices within their network. Providers establish a mapping between customer configurable CVs and the corresponding local preference values within the provider network.

Routing protocol generally determines the active route by selecting the route with the lowest preference value. The preference is an arbitrary value in the range 0 through 255 that software uses to rank routes received from different protocols, interfaces, or remote systems. When routes in the routing table are nearly identical, the routing protocol process prefers the route whose next hop has the lowest IP address. The preference value is used to select routes to destinations in external ASs or routing domains; it has no effect on the selection of routes within an AS (within an IGP). Routes within an AS are selected by the IGP and are based on that protocol's metric or cost value.

An examination is performed to verify that the identified serving site PE router IP address is present in the routing table (step 427). The next hop for the IP address of the member site PE is verified to be the IP address of the identified serving site PE router (step 429). An examination is performed if the route is present in the IRSCP SM (step 431).

If the route is present in the IRSCP SM, the CVs, PREF and application values related to the prefix and VRF are examined (step 433). If any of the PREF equal 0, or if the prefix list equal URL blocking, or if the application equals URLBLK on the customer report route (yes), there is a problem with the routing policy (steps 435, 437).

The Route Reflector (RR) is examined by executing the "show route receive-protocol" command BGP with RR IP and CV value to determine if the RR route map contains the IRSCP route map (step 439). Normally, there may be one active RR for a given VPN coupled with a hot-standby RR. If the identified serving site PE router IP address is present in the routing table of the RR, or if the CV has IRSCP community markings (steps 441, 443, 445) (yes), there is an IRSCP routing problem (step 447).

If there is no IRSCP routing problem, an examination is performed on weights or local preferences at the identified serving site PE router (step 449). The local preference and route weight for the route originating from the CE router that a customer reported trouble are examined to locate any biased route settings (step 449). If the local preference or weight is too low for the identified serving site PE router (yes), the problem is a customer policy defect (steps 451, 455). If there is no customer policy defect, the IRSCP does not have a problem (step 453).

The IRSCP SM 259 forwards the trouble ticket to an appropriate work center based on the diagnostic results indicated above. The system and method promote zero touch service assurance automation. MTTR is minimized, and operation efficiency, network availability and network performance is improved.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for analyzing Intelligent Route Service Control Point Layer 3 network performance comprising:
   for a network, establishing a network inventory of Provider Edge routers;
   receiving a problem report identifying a serving site Provider Edge router;
   accessing an Intelligent Route Service Control Point Service Manager and retrieving customer defined routing data for the identified serving site Provider Edge router;
   acquiring live routing data from the identified serving site Provider Edge router;
   comparing the acquired live routing data from the serving site Provider Edge router with the corresponding routing data from the Intelligent Route Service Control Point Service Manager to identify disparities;
   if disparities are found, identifying a configuration problem between the Intelligent Route Service Control Point Service Manager and the identified serving site Provider Edge router; and
   if no disparities are found, examining Intelligent Route Service Control Point routes in the identified serving site Provider Edge router routing table to locate a source Provider Edge router route.

2. The method according to claim 1 further comprising:
   if a Virtual Private Network Internet Protocol address of the source Provider Edge router is not found in the identified serving site Provider Edge router routing table, identifying a routing table problem; and
   if the Virtual Private Network Internet Protocol address of the source Provider Edge router is found in the identified serving site Provider Edge router's routing table, analyzing each Community Value associated with the routes in the identified serving site Provider Edge router's routing table to verify Intelligent Route Service Control Point route settings.

3. The method according to claim 2 further comprising verifying that the next hop route for the source Provider Edge router is the identified serving site Provider Edge router.

4. The method according to claim 3 further comprising examining if the route is present in the Intelligent Route Service Control Point Service Manager.

5. The method according to claim 4 further comprising:
   if the next hop route is present in the Intelligent Route Service Control Point Service Manager, examining the Community Values, prefix list, and application values related to the source Provider Edge router prefix and a Virtual Private Network Routing and Forwarding routing instance; and
   if the source Provider Edge router has any Community Value equal to 0, or if the prefix list equal Uniform Resource Locator blocking, or if the Virtual Private Network Routing and Forwarding application values equal URLBLK, identifying a routing policy problem.

6. The method according to claim 5 further comprising:
   examining the network Route Reflector routing table; and
   if the identified serving site Provider Edge router Internet Protocol IP address is not present or if the identified serving site Provider Edge router Community Value does not have Intelligent Route Service Control Point community markings, identifying an Intelligent Route Service Control Point routing problem.

7. The method according to claim 6 further comprising:
   if there is no Intelligent Route Service Control Point routing problem, examining the identified serving site Provider Edge router weights and/or local preferences; and
   if the identified serving site Provider Edge router weights and/or local preferences are too low, identifying a customer policy defect.

8. The method according to claim 6 wherein examining the Route Reflector is performed using a "show route receive-protocol" command BOP with Route Reflector Internet Protocol and Community Value value to determine if the Route Reflector routing table contains the Intelligent Route Service Control Point routing table.

9. The method according to claim 1 wherein the problem report includes a customer Virtual Private Network location.

10. The method according to claim 1 wherein the live routing data from the identified serving site Provider Edge router is acquired using a "router # show IP BOP VPNv4" command with VRF and Prefix.

11. The method according to claim 2 where the Intelligent Route Service Control Point routes in the routing table of the Identified serving site Provider Edge router are acquired using a "show IP route VRF' command with Virtual Private Network Routing and Forwarding and Prefix to display the Internet Protocol routing table associated with a Virtual Private Network Routing and Forwarding routing instance, in user EXEC or privileged EXEC mode.

12. The method according to claim 2 wherein each Community Value is acquired using a "showIP BGP VPNv4" command with Community Value as input.

13. A method for analyzing Intelligent Route Service Control Point Layer 3 network performance comprising:
   for a network, establishing a network inventory of Provider Edge routers;
   receiving a problem report identifying a serving site Provider Edge router;

accessing an Intelligent Route Service Control Point Service Manager and retrieving customer defined routing data for the identified serving site Provider Edge router;

acquiring live routing data from the identified serving site Provider Edge router;

comparing the acquired live routing data from the serving site Provider Edge router with the corresponding routing data from the Intelligent Route Service Control Point Service Manager to identify disparities, wherein the customer defined routing data comprises ingress Provider Edge identity, egress Provider Edge identity, prefix, Route Target, PREF (0-5), Community Value, and application.

14. A method for analyzing Intelligent Route Service Control Point Layer 3 network performance comprising:

for a network, establishing a network inventory of Provider Edge routers;

receiving a problem report identifying a serving site Provider Edge router;

accessing an Intelligent Route Service Control Point Service Manager and retrieving customer defined routing data for the identified serving site Provider Edge router;

acquiring live routing data from the identified serving site Provider Edge router;

comparing the acquired live routing data from the serving site Provider Edge router with the corresponding routing data from the Intelligent Route Service Control Point Service Manager to identify disparities; and examining Preference Value, prefix list and application to detect a customer's faulty data input.

15. A tangible computer-readable medium, excluding signals and carrier waves, storing computer-readable instructions to analyze an Intelligent Route Service Control Point Layer 3 network, the computer-readable instructions, when executed, to cause a machine to at least:

query an Intelligent Route Service Control Point Service Manager to retrieve customer defined routing data for a serving site Provider Edge router associated with a problem report;

acquire live routing data from the identified serving site Provider Edge router;

compare the acquired live routing data from the serving site Provider Edge router to corresponding routing data retrieved from the Intelligent Route Service Control Point Service Manager to identify a disparity;

if the disparity is found, identify a configuration problem between the Intelligent Route Service Control Point Service Manager and the identified serving site Provider Edge router; and if the disparity is not found, examine Intelligent Route Service Control Point routes in the identified serving site Provider Edge router's routing table to locate a source Provider Edge router route.

16. A tangible computer-readable medium as defined in claim 15, wherein the computer-readable instructions, when executed, further cause the machine to:

if a Virtual Private Network Internet Protocol address of the source Provider Edge router is not found in the identified serving site Provider Edge router's routing table, identify a routing table problem; and if the Virtual Private Network Internet Protocol address of the source Provider Edge router is found in the identified serving site Provider Edge router's routing table, analyze each Community Value associated with the routes in the identified serving site Provider Edge router's routing table to verify a Intelligent Route Service Control Point route setting 17. A tangible computer-readable medium, excluding signals and carrier waves, storing machine-readable instructions to analyze an Intelligent Route Service Control Point Layer 3 network, the computer-readable instructions, when executed, to cause a machine to at least:

query an Intelligent Route Service Control Point Service Manager to retrieve customer defined routing data for a serving site Provider Edge router associated with a problem report;

acquire live routing data from the identified serving site Provider Edge router; and compare the acquired live routing data from the serving site Provider Edge router to corresponding routing data retrieved from the Intelligent Route Service Control Point Service Manager to identify a disparity, wherein the customer defined routing data comprises ingress Provider Edge identity, egress Provider Edge identity, prefix, Route Target, PREF (0-5), Community Value, and application.

18. A tangible computer-readable medium, excluding signals and carrier waves, storing computer-readable instructions to analyze an Intelligent Route Service Control Point Layer 3 network, the machine-readable instructions, when executed, to cause a machine to at least:

query an Intelligent Route Service Control Point Service Manager to retrieve customer defined routing data for a serving site Provider Edge router associated with a problem report;

acquire live routing data from the identified serving site Provider Edge router;

compare the acquired live routing data from the serving site Provider Edge router to corresponding routing data retrieved from the Intelligent Route Service Control Point Service Manager to identify a disparity; and examine a Preference Value, a prefix list and an application to detect a customer's faulty data input.

\* \* \* \* \*